Oct. 31, 1967
H. T. LIBBY
3,350,534
ELECTRODE HOLDER
Filed April 6, 1964
2 Sheets-Sheet 1
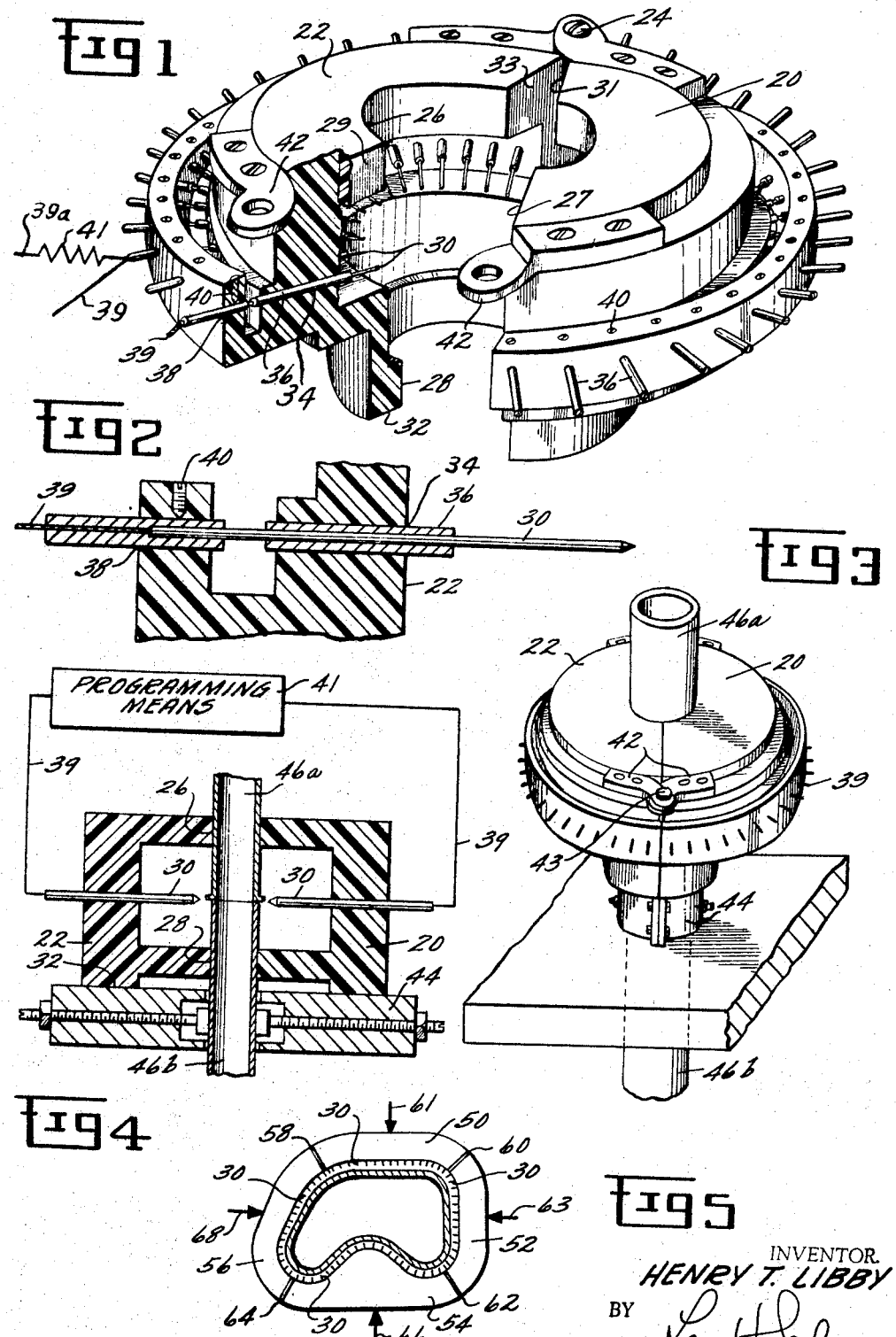
INVENTOR.
HENRY T. LIBBY
BY
ATTORNEY Oct. 31, 1967  H. T. LIBBY  3,350,534
ELECTRODE HOLDER
Filed April 6, 1964  2 Sheets-Sheet 2
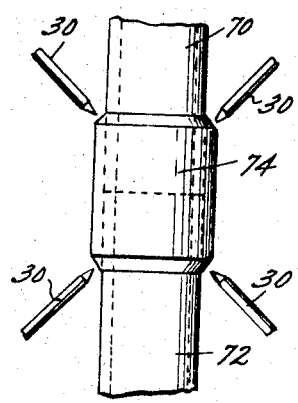
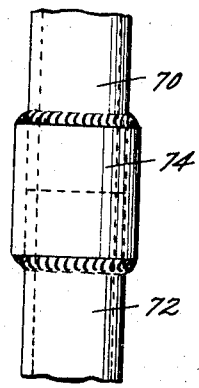
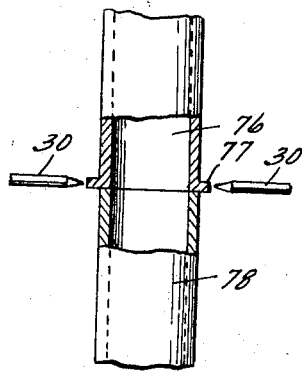
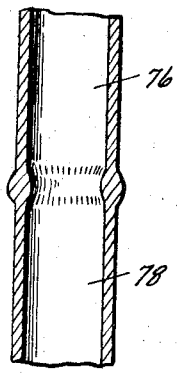
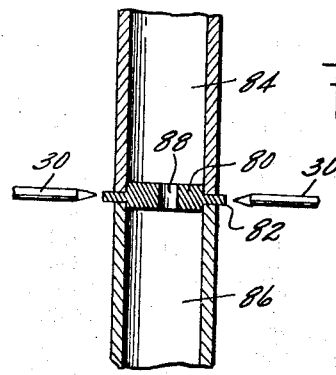
INVENTOR.
HENRY T. LIBBY
BY
*Lee H Sachs*
ATTORNEY—

United States Patent Office 3,350,534
Patented Oct. 31, 1967

3,350,534
ELECTRODE HOLDER
Henry Thomas Libby, Reading, Mass., assignor to General Electric Company, a corporation of New York
Filed Apr. 6, 1964, Ser. No. 357,403
4 Claims. (Cl. 219—60)

This invention relates generally to arc welding and, more particularly, is concerned with a holder for a plurality of non-consumable arc welding electrodes for use in programmed arc welding.

U.S. Patent 3,114,829—Libby, issued December 17, 1963 and assigned to the assignee of the present invention, discusses the positioning, programming and use, along a proposed juncture, of a plurality of non-consumable arc welding electrodes, electrically insulated one from the other, the arc cone area on the workpiece of one electrode in operation overlapping the arc cone area of its next adjacent electrodes. The distance between each electrode and the corresponding workpiece portion, as well as the power to be applied, define the area of such arc cone. Therefore, it is desirable for the control of quality of welds in production to control and maintain accurately and repeatedly the distance between each electrode tip and its corresponding workpiece juncture portion as well as the distance between adjacent electrode tips.

Fixtures to hold a plurality of non-consumable electrodes along a proposed workpiece juncture which is readily accessible at least from one side of the workpiece, have been used. Some of these types are shown in the above identified patent in FIGS. 1, 8 and 10. However, when certain multiple workpieces such as long tubes, rods, bars and the like are to be joined, around or nearly around their periphery, known holders are not practical to provide a continuous, quality weld. Furthermore, it has been found that insulating materials which allow a high frequency electrical tracking path to exist, particularly on its surface, are unsuitable for holding the electrodes.

It is a principal object of the present invention to provide an improved holder, having heat resistance and high-frequency electrical tracking and welding current arc over resistance, for a plurality of non-consumable welding electrodes to hold electrodes stationary in proper position along a juncture which traces a closed or nearly closed figure. The holder provides ease of application and removal of electrodes from welding relationship with the workpiece.

Another object is to provide such a holder which allows abutting workpieces to be welded to extend on both sides through the holder.

Another object is to provide such a holder having a plurality of coordinated segments to hold stationary in the desired position a plurality of non-consumable electrodes required to program arc weld a proposed juncture.

These and other objects and advantages will be more readily understood from the following detailed description, examples and the drawing in which:

FIG. 1 is an isometric partially sectional view of one form of a holder of the present invention for use in welding circular rods or tubes;

FIG. 2 is a fragmentary sectional view of the electrode holding portion of FIG. 1;

FIG. 3 is an isometric view of the holder of FIG. 1 in the operation of welding a circular tube;

FIG. 4 is a sectional, diagrammatic representation of the holder in operation in FIG. 3;

FIG. 5 is a diagrammatic representation of the holder of the present invention including more than two cooperating segments;

FIGS. 6 and 7 are fragmentary views of thin wall tubing before and after being joined at a coupling using the present invention;

FIG. 8 is a fragmentary, sectional view of one form of thin wall tubing which can be welded using the present invention;

FIG. 9 is a fragmentary, sectional view of the tubing of FIG. 8 after welding; and FIG. 10 is a fragmentary, sectional view of another form of thin wall tubing and insert which can be welded using the present invention.

Briefly, one form of the electrode holder of the present invention comprises a plurality of arc welding electrode holder segments made of a high frequency electrical non-tracking dielectric material. Each segment includes heat resistant electrode holding means to hold and space each of a plurality or non-consumable electrodes in electrical and thermal insulation one from the other and from the dielectric material, electrode locating means to locate the plurality of electrodes along a juncture to be welded so that the arc cone area of one electrode overlaps the arc cone area of its next adjacent electrode in operation, electrode gapping means to space the electrodes from the workpiece juncture to be welded, segment locating means to locate each segment with respect to other segments and electrical connecting means to connect each electrode individually to a source of welding current.

In another form, the holder can include means through at least one of the plurality of segments to introduce a gas to the juncture area. In still another form, the apparatus of the present invention includes segment moving means to move the plurality of segments toward or away from the workpiece juncture to be welded so that the various segment locating means will cooperate one with the other to locate all of the plurality of electrodes of all of the segments along the entire workpiece juncture to be welded.

One of the most significant applications of the holder of the present invention, shown in FIG. 1, is the joining of two relatively long pieces of metal pipe or tubing as shown in the isometric view of FIG. 3 and diagrammatically in FIG. 4.

The holder shown in FIGS. 1, 3 and 4 includes two holder segments 20 and 22 joined at a pivotal connection such as hinge 24. Surfaces 27 and 31 of segment 20, which register with surfaces 29 and 33 of segment 22, provide segment locating means with respect to one another. Each holder segment is made of a high frequency electrical non-tracking polymeric material such as an acrylic resin. Acrylic resins have been found particularly useful because of the ease with which they can be worked or formed and their excellent high frequency electrical non-tracking characteristics because an electric arc tracking across the surface will cause decomposition of the material without residue. Thus the electrical path is broken. High frequency tracking or arc-over of the D.C. welding current between the electrodes has been found to cause skips in the weld. Forms of this acrylic polymeric material are known as Plexiglas material or Lucite material.

The holder has a radial locating means such as projection 26 and may have a second radial locating means such as 28 in the event a gas entrapping enclosure is desired. Electrodes 30, when introduced and held stationary in the holder, are positioned with respect to the radial locating means so that when the holder is in operating position the radial locating means will locate the tips of the electrodes a desired distance from a workpiece 46a and 46b in FIGS. 3 and 4. Each electrode holder segment includes an axial locating or gage means which in simple form can be a surface 32 at the bottom of the holder to cooperate with a workpiece holding fixture 44 in FIGS. 3 and 4, to position or locate the tips of the electrodes axially along the workpiece at a desired position opposite a juncture to be welded.

Each electrode holder segment includes a plurality of electrode receiving ports 34, FIG. 1, including a heat resistant barrier 36 between the electrode 30 and holder body, to receive a non-consumable welding electrode. Thus a preferred combination of a high frequency, electrical non-tracking, easily shaped material such as an acrylic resin with a heat resistant electrode receiving port allows practical manufacture of easily used holders. In the form shown in FIG. 1, port 34 includes a ceramic tube 36, in this example a material commercially known as "Mullite" material, to insulate the electrode both electrically and thermally from the polymeric body material of the electrode holder segment. Each electrode port can communicate with an electrical lead port such as 38 or can extend completely through the holder where it is connected to an electric lead 39. Hence each electrode can be connected with at least one electrical conductor or lead 39 to a welding power source through a programming means 41 of a type described in U.S. Patent 3,114,829— Libby.

The present invention, in one form, contemplates the inclusion of electrical resistors, such as resistor 41 in FIG. 1, in selected additional electrical leads 39a which accompany ordinary leads 39 to an electrode to allow selected further control and decay of welding current where desired. This arrangement is particularly useful in an additional series of leads to the same electrodes which repeat the welding operation over a portion of the juncture first welded in operation. By adjusting welding current in the concluding portion of the arc weld, the last individual arc weld nugget will flow into the first arc weld nugget thus forming a continuous flowing fusion-type weld without cracks. The first electrodes in a series may be connected with two sets of leads, one without resistors and one with appropriate resistors to decay the current as desired on the rewelding portion of the cycle. The placement of electrical resistors in the leads associated with the holder designed for a particular article configuration rather than in the programming means 41 of FIG. 4, allows the use of the programming means for a variety of applications without resistor modification in the programming means itself.

For rapid and easy removal and replacement of electrodes, a fastening means such as set screw 40 can be provided for each electrode in the electrode holder segment. Details of one arrangement are shown in FIG. 2. The plurality of electrode ports 34 in FIGS. 1 and 2 are located in each segment along a line which coincides with the shape of a portion of a juncture to be welded in the workpiece. When adjacent segments of the plurality of segments are in registry, such at surfaces 27–29 and 31–33 in FIG. 1, the electrode ports, and hence the electrodes carried therein, follow the path of the entire juncture to be welded. The spacing between the ports 34 is set so that when an electrode carried by the port is activated or arced in the welding operation, its arc cone area will overlap those of its next adjacent electrodes. The arc cone area and its function in the practice of programmed arc welding is more fully discussed in U.S. Patent 3,114,829— Libby. The holder of FIG. 1 is provided with a clamping means such as lugs 42 through which a pin 43 in FIG. 3 can be placed. This clamping means in cooperation with hinge 24 maintains registry of the two electrode segments during operation.

If it is desired to conduct the welding operation under a reducing or inert gas atmosphere, the holder can be provided with a gas inlet port (not shown) to introduce gas into the internal portions of the holder in the area of the electrodes. Generally there is enough clearance between portions of the electrodes holder and the workpiece to allow such gas to escape without the provision of a gas outlet port. It is important to note, however, that the flow of gas must be at a rate sufficiently low so as not to disturb the arc between each electrode and the workpiece.

Although FIGS. 1, 3 and 4 represent two segment holders which in most instances would represent a practical number for most workpiece configurations, nevertheless the present invention contemplates the use of additional segments for complex shapes such as in large ducting, or in traveling wave guide members used in radar equipment, shown in cross-section in FIG. 5. In FIG. 5 the segments 50, 52, 54 and 56 each carry a plurality of electrodes 30. Adjacent segments are moved into registry at 58, 60, 62 and 64 by an electrode holder segment segment moving means shown schematically at 61, 63, 66 and 68 such as a motor driven shaft with appropriate controls such as a servo mechanism.

The various types of tubing connections shown in FIGS. 6 and 7 can be made through the use of the present invention without the addition of a filler material. In FIG. 6, tubing portion 70 and 72 can be welded through a coupling 74 by positioning electrodes 30 in the holder of the present invention appropriately around the two junctures to provide the welded structure of FIG. 7 using material of the coupling as a filler material. In an actual operation, two 1″ O.D. stainless steel tubes 70 and 72 were welded through a 1.2″ O.D. stainless steel sleeve or coupling. Thirty-six spaced electrodes having a diameter of 0.04″ and made of a 1 weight percent thorium, balance tungsten alloy were used at an electrode radial mounting of 0.093″. The electrode gap between the workpiece juncture and the tip of the electrode was 0.04″ with the electrode angle being normal to the sleeve chamfer. A shielding gas of argon at 15 cubic feet per hour was used. A welding current of 85 amps D.C. with the electrode negative was used with a weld time of 10 cycles on and 8 cycles off. The welding speed was approximately 20 inches per minute with the entire weld being completed in about 11 seconds.

Thus the electrode holder of the present invention can include multiple rows of electrodes to weld more than one juncture in a single operation. Similarly, in FIG. 8 tube segments 76 and 78 can be joined at a juncture using a portion of one of the tubes such as flange 77 of tube 76 as the filler material to result in the welded article of FIG. 9. If desired in the workpiece arrangement of FIG. 8, the electrode cycle can be fired twice—once to preheat and once to weld.

Another arrangement which can be used with the holder of the present invention is shown in FIG. 10 using an insert 80 having a projection 82 which extends between the tube members 84 and 86. Insert 80 can be an annular member of "T" cross-section to provide filler material at the joint or can be a larger plug with or without an orifice 88 to stop or control flow of fluid in a tube.

Although the present invention has been described in connection with specific examples and embodiments, these are meant merely as examples of the broader scope of the invention as will be understood by those skilled in the welding and manufacturing arts.

What is claimed is:

1. An electrode holder for a plurality of non-consumable arc welding electrodes comprising:
   a plurality of arc welding electrode holder segments of a high frequency electrical non-tracking dielectric material, each segment including
   (a) a plurality of spaced-apart electrode receiving ports each port including a heat resistant barrier to receive an electrode, to hold an electrode tip generally radially inward from the holder and to separate the electrode from the non-tracking material;
   (b) a locating surface of the segment shaped to cooperate with a locating surface of an adjacent segment to position the plurality of segments circumferentially about the workpiece;
   (c) a radial locating surface of the segment directed to register with respect to a workpiece to locate the electrode tip in spaced relation with a workpiece juncture to be welded;
   (d) an axial locating surface of the segment to locate the segment along the axis of the workpiece with respect to the workpiece juncture to be welded;

means to hold adjacent segments in registry one with the other at adjacent locating surfaces; and electrical conducting means for each electrode to connect each electrode to a source of welding current.

2. The electrode holder of claim 1 in which the electrical conducting means for at least one of the electrodes includes electrical resistor means.

3. The holder of claim 1 in which:

the high frequency electrical non-tracking dielectric material is a polymeric material; and the heat resistor barrier is a ceramic tube.

4. The holder of claim 3 wherein said holder segments are in the form of two semicircular segments pivotally connected one with the other at a position radially outward of the segments to enable the segments to move one toward the other to bring into registry adjacent circumferential locating surfaces.

References Cited
UNITED STATES PATENTS

| | | | |
|---|---|---|---|
| 808,186 | 12/1905 | Benjamin | 219—123 |
| 1,775,311 | 9/1930 | Halle | 219—60 X |
| 2,049,763 | 8/1936 | De Forest. | |
| 2,179,176 | 11/1939 | Dunn | 219—60 |
| 2,934,587 | 4/1960 | Duffy et al. | 174—146 X |
| 3,114,829 | 12/1963 | Libby | 219—124 |

RICHARD M. WOOD, *Primary Examiner.*

JOSEPH V. TRUHE, *Examiner.*